E. W. PADDISON.
JEWELER'S LOUPE.
APPLICATION FILED OCT. 17, 1921.
1,424,848.
Patented Aug. 8, 1922.
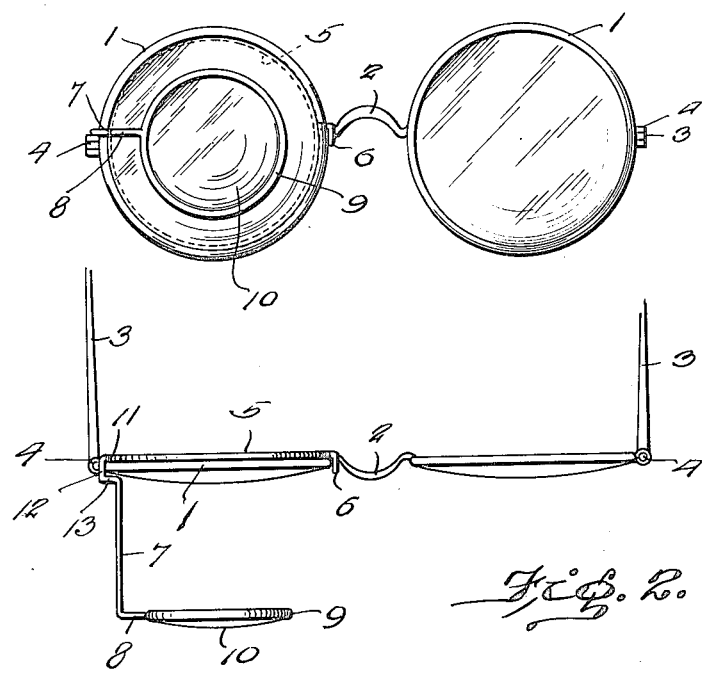
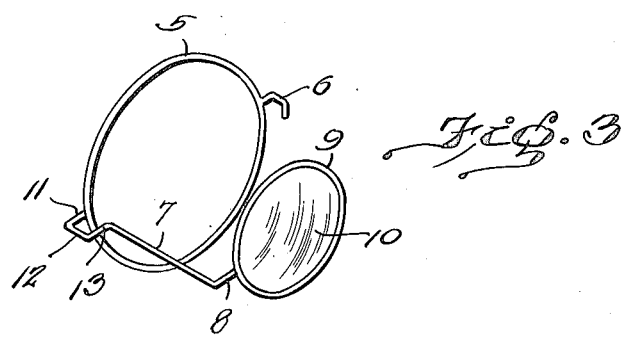
Inventor
Eugene W. Paddison
By Edwin S Clarkson
Attorney

UNITED STATES PATENT OFFICE.

EUGENE W. PADDISON, OF MOUNT AIRY, NORTH CAROLINA.

JEWELER'S LOUPE.

1,424,848.  Specification of Letters Patent.  Patented Aug. 8, 1922.

Application filed October 17, 1921. Serial No. 508,243.

*To all whom it may concern:*

Be it known that I, EUGENE W. PADDISON, a citizen of the United States, residing at Mount Airy, in the county of Surry and State of North Carolina, have invented certain new and useful Improvements in Jewelers' Loupes, of which the following is a specification.

This invention relates to jewelers' loupes, which are used by watchmakers and others who require a magnifying glass which can be held in front of the eye.

The primary object of this invention is to provide a jeweler's loupe which can be supported upon and by the frame of a pair of spectacles or eye-glasses so as to eliminate the necessity of the user employing the muscles of the eye for supporting the loupe.

A further object is to provide a device of the above mentioned character which is not supported directly by the lens of the eyeglasses, thus eliminating the danger of breakage of said lens.

Other objects and advantages of this invention will be apparent to those skilled in the art to which it appertains, and the particular features of novelty will be pointed out in the appended claims, it being understood that various changes in the form and proportion of the device may be made within the scope of the appended claims without departing from the spirit of the invention.

In the drawings forming a part of this specification and wherein similar characters of reference designate similar parts in the several views:

Figure 1 is a front elevation of the device applied to a pair of spectacles.

Fig. 2 is a top plan view of the device applied to a pair of spectacles, and

Fig. 3 is a perspective view of the device.

Referring now more particularly to the drawings, Figures 1 and 2 show views of the present invention applied to a pair of spectacles, the latter having the usual lens rims 1, nose piece 2, and ear pieces 3 joined to the lens rims by pivots 4.

The device embodying my invention comprises a relatively large supporting ring 5, having secured to the periphery thereof, a forwardly and downwardly extending hook element 6.

Secured to the ring 5, substantially diametrically opposite the hook element 6, is a connecting wire or link 7, the opposite end of which is angularly bent as shown at 8, and is secured to a lens rim 9, within which is mounted a magnifying lens 10, said link 7, it is obvious supporting the ring 5, and lens rim 9 in uniform spaced relation.

The link 7, near the juncture of the ring 5 is off-set forming by sections 11, 12 and 13 a substantially U-shaped portion at that end of the link. The section 13 is of greater length than section 11 and this, in conjunction with the angular end, at the juncture of the rim 9, serves to place the portion of the link 7 intermediate the ends thereof in a plane at right angles to the vertical plane of ring 5.

This particular positioning of the link is essential in that it eliminates any possibility of the link interfering with the vision when the eye of the user is focused through lens 10.

In use, the present invention is designed for jewelers or watchmakers who are obliged to wear spectacles, the ring 5, being positioned adjacent the inner side of the lens of rim 1, with the hook element 6 engaged over the nose piece 2 at the juncture of said nose piece and rim 1. The section 12 of the U-shaped end of link 7, serves to support the ring 5 in position by resting upon the pivot 4 of the ear piece 3, and the section 13 of said U-shaped end serves as a keeper for preventing the accidental dislodgement of the ring 5.

The device just described is preferably formed of yielding material so that one standard size of the device may be used efficiently with various sized spectacle lens rims.

What I claim is:

1. A jeweler's loupe comprising a ring provided with a hook for engagement with the nose piece of a pair of spectacles, a lens rim, a lens therein, a link connecting said lens and rim whereby said ring and lens rim are held in spaced parallel relation, and means on said link co-operating with the above mentioned hook element for supporting said loupe in operative position, said means being adapted to seat on the pivot of an ear piece of a pair of spectacles.

2. Means for supporting a magnifying lens, comprising a ring, a hook secured to said ring, and so formed as to engage the nose piece of a pair of spectacles, a link secured to said magnifying lens and ring, and provided with an off-set portion near the juncture of the ring and link, whereby said ring is supported adjacent one lens of a pair of spectacles.

3. The combination with a lens frame, of a resilient link having an off-set portion at one end thereof, a ring secured to said link, and a hook element secured to said ring.

4. In combination with a magnifying lens, a ring, a hook element secured to said ring, and a link connecting said ring and lens, said link having a substantially U-shaped portion at one end thereof, and an angular portion at the opposite end.

5. A jeweler's loupe, comprising a ring, provided with a hook element adapted to engage the nose piece of a pair of spectacles, and means terminating in a lens holding link, secured to said ring and adapted to frictionally engage the pivot at the juncture of the ear piece and a lens of a pair of spectacles whereby the above mentioned hook element and said means will support the ring adjacent the lens of a pair of spectacles.

In testimony whereof I affix my signature.

EUGENE W. PADDISON.